United States Patent
Barber, Jr. et al.

(10) Patent No.: US 6,897,715 B2
(45) Date of Patent: May 24, 2005

(54) MULTIMODE VOLTAGE REGULATOR

(75) Inventors: Thomas James Barber, Jr., Bolton, MA (US); Stacy Ho, San Antonio, TX (US); Paul Ferguson, Jr., North Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 10/435,862

(22) Filed: May 12, 2003

(65) Prior Publication Data
US 2004/0000896 A1 Jan. 1, 2004

Related U.S. Application Data
(60) Provisional application No. 60/384,355, filed on May 30, 2002.

(51) Int. Cl.$^7$ ................................................ G05F 1/10
(52) U.S. Cl. ...................... 327/541; 327/543; 323/316
(58) Field of Search ............................. 327/538, 540, 327/541, 546; 307/43, 64; 323/315, 316

(56) References Cited

U.S. PATENT DOCUMENTS

| | | | | |
|---|---|---|---|---|
| 4,617,473 A | * | 10/1986 | Bingham | 307/66 |
| 4,683,382 A | | 7/1987 | Sakurai et al. | |
| 5,295,112 A | * | 3/1994 | Taniguchi | 365/227 |
| 5,463,588 A | * | 10/1995 | Chonan | 365/226 |
| 5,545,978 A | | 8/1996 | Pontius | |
| 5,621,601 A | * | 4/1997 | Fujihira et al. | 361/93.9 |
| 5,631,598 A | | 5/1997 | Miranda et al. | 327/540 |
| 5,703,415 A | * | 12/1997 | Tanaka | 307/66 |
| 5,821,808 A | * | 10/1998 | Fujima | 327/541 |
| 5,862,091 A | * | 1/1999 | Bion et al. | 365/207 |
| 5,867,015 A | | 2/1999 | Corsi et al. | |
| 5,889,395 A | | 3/1999 | Lundberg | |
| 5,917,311 A | | 6/1999 | Brokaw | |
| 6,002,295 A | | 12/1999 | Gens et al. | |
| 6,058,061 A | * | 5/2000 | Ooishi | 365/222 |
| 6,084,389 A | * | 7/2000 | Gens et al. | 323/315 |
| 6,225,857 B1 | | 5/2001 | Brokaw | 327/540 |
| 6,333,669 B1 | * | 12/2001 | Kobayashi et al. | 327/541 |
| 6,838,927 B2 | * | 1/2005 | Oonishi | 327/534 |
| 2004/0008077 A1 | | 1/2004 | Ho et al. | |

OTHER PUBLICATIONS

R. Jacob Baker, Harry W. Li & David E. Boyce, CMOS: Circuit Design, Layout, And Simulation. 699–703, 717 (Stuart K. Tewksbury, series ed., IEEE Press) (1998).

* cited by examiner

Primary Examiner—Terry D. Cunningham
(74) Attorney, Agent, or Firm—Iandiorio & Teska

(57) ABSTRACT

A multimode voltage regulator includes a low current pass device and a high current pass device each adapted for connection between a power supply and a load; an error amplifier responsive to a difference between a reference voltage and a function of the voltage on the load to produce an error signal; and a low power driver responsive in a low load power mode to an error signal for operating the low current pass device to provide low power to the load and a high power driver responsive in a high load power mode to an error signal for operating the high current pass device to provide high power to the load for maintaining efficiency over high and low power load operation.

15 Claims, 5 Drawing Sheets

US 6,897,715 B2

MULTIMODE VOLTAGE REGULATOR

RELATED APPLICATIONS

This application claims priority of U.S. Provisional Application Ser. No. 60/384,355 filed May 30, 2002.

FIELD OF THE INVENTION

This invention relates to a multimode voltage regulator for improving efficiency in both low and high power modes.

BACKGROUND OF THE INVENTION

Power supplies used in portable systems, such as Global System for Mobile Communications (GSM) mobile terminals, must be able to take advantage of the time varying nature of such systems. Typically, portable systems have an active state where the power supply is required to provide the full operating current (high power mode) and a standby state that requires minimal operating current (low power mode). For example, when the digital baseband engine in a GSM mobile terminal is actively processing data the power supply is required to provide the full operating current, but when the digital engine is not processing data the power supply is required to provide only leakage current. When a GSM mobile terminal is waiting for a call, paging mode, the terminal may be active less than 0.1% of the time. To provide maximum battery life the power supply for a GSM mobile must be highly efficient while sourcing leakage current and while sourcing operating current.

In the past, typically, low dropout voltage regulators (LDOs) were used to provide multiple stable supply voltages in battery-operated applications. However, standard LDOs exhibit poor efficiency as the difference between input and output voltage is increased. Recently, a number of DC/DC converter architectures have been proposed for portable systems to improve the efficiency of portable systems. These DC/DC converters tend to have low efficiency at the extremely low current loads (<200 µA) associated with leakage conditions. Additionally, these DC/DC converters tend to have either large output voltage ripple or slow voltage transient response. A linear regulator is often required either to provide a stable supply at extremely low current loads, to provide additional rejection of power supply noise, or to provide additional rejection of load noise.

BRIEF SUMMARY OF THE INVENTION

It is therefore an object of this invention to provide a multimode voltage regulator with improved efficiency in both low and high power modes.

It is a further object of this invention to provide such a multimode voltage regulator which uses but one error amplifier and one compensation circuit.

It is a further object of this invention to provide such a multimode voltage regulator which results in more stable output voltages.

It is a further object of this invention to provide such a multimode voltage regulator which has good power supply rejection at high frequency.

It is a further object of this invention to provide such a multimode voltage regulator which has good line and load transient response.

It is a further object of this invention to provide such a multimode voltage regulator which permits the use of a DC/DC converter in the high power mode.

The invention results from the realization that an improved voltage regulator which has high efficiency in both high and low power modes can be effected by selectively operating high power and low power pass devices using high power and low power drivers in response to a single error amplifier output to optimize the efficiency in the high power and low power modes.

This invention features a multimode voltage regulator including a low current pass device and a high current pass device each adapted for connection between the power supply and the load. An error amplifier is responsive to a difference between a reference voltage and a function of the voltage on the load to produce an error signal. A low power driver responsive in a low load power mode to an error signal operates the low current pass device to provide low power to the load and a high power driver responsive in a high load power mode to an error signal operates the high current pass device to provide high power to the load for maintaining efficiency over high and low load power demands.

In a preferred embodiment, the low power driver may be on in both a high power mode and low power mode. The high power driver may be on only in the high power mode. The high power driver may include a control terminal for turning it on during a high power mode and off during a low power mode. The low power driver may include a control terminal for turning it on during a low power mode and off during a high power mode. The pass devices may be transistors. The low pass device may have a smaller active area and the high pass device a larger active area, relatively speaking. The error amplifier may include a current source, a differential pair and a current mirror. The low power driver may include a non-inverting driver circuit. The high power driver may include a non-inverting driver circuit with a dynamic bias boost system for dynamically increasing the current output of the high power driver in the high low power mode. There may be a DC/DC converter between the power supply and the high current pass device. There may be a compensation circuit connected between the input of the high power driver and the output of the high pass device. There may be a voltage divider connected between the output of the high pass device and the error amplifier to produce the function of the voltage on the load.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
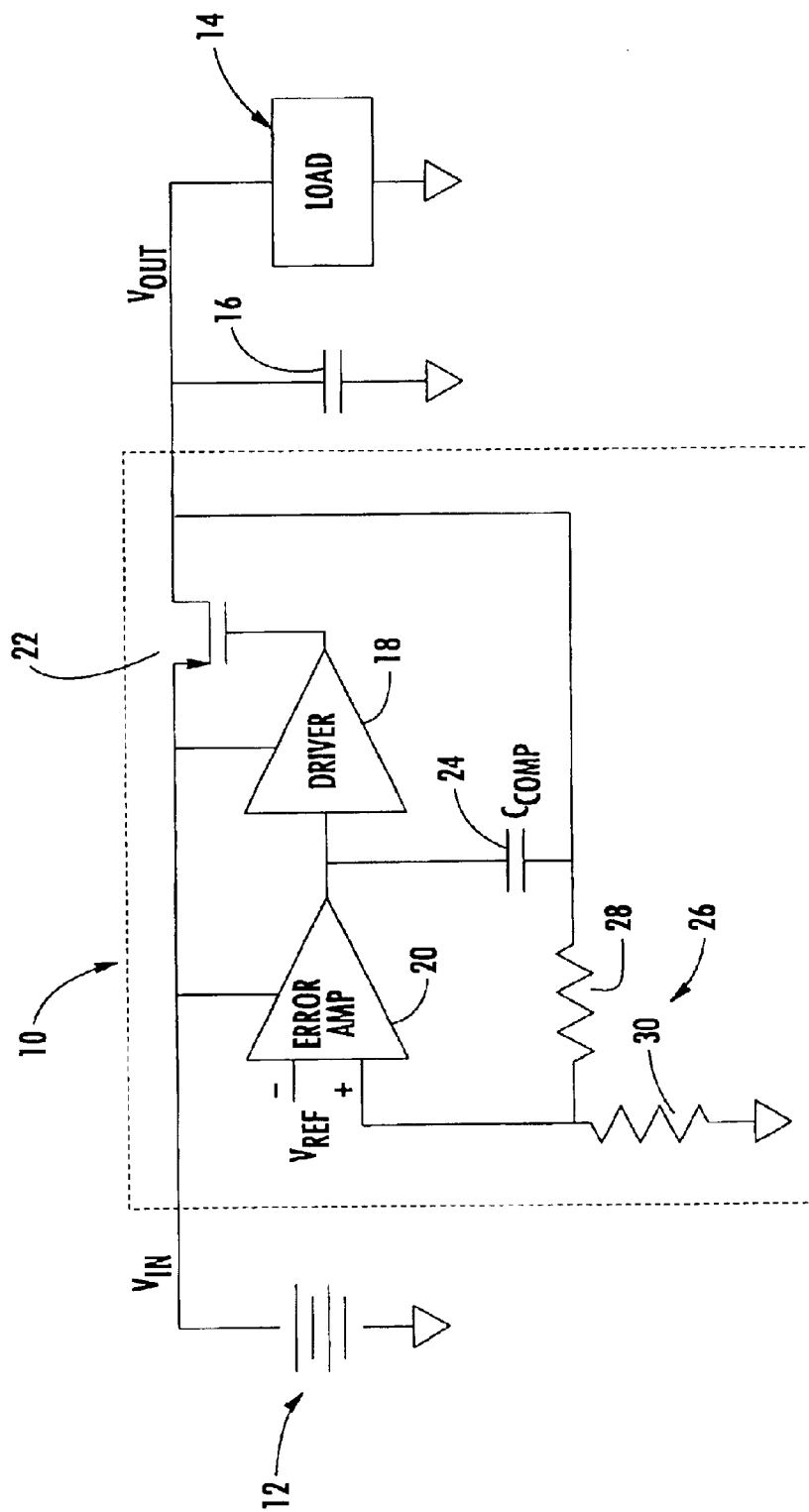
FIG. 1 is a simplified schematic diagram of a prior voltage regulator.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

There is shown in FIG. 1 a conventional voltage regulator 10 which regulates the voltage between a power supply, battery, 12 and the load 14 which typically has associated with it a filter such as capacitor 16. Voltage regulators of the type of voltage regulator 10 are shown in U.S. Pat. No. 5,631,598 and include a single driver 18 and an error amplifier 20. Driver 18 operates a pass device such as MOSFET 22, connected between a power supply, battery, 12 and load 14. Output voltage $V_{out}$ is a function of resistor divider 26, consisting of resistors 28 and 30, in the feedback loop consisting of error amplifier 20, driver 18, filter capacitor 16, load 14, compensation capacitor 24 and resistor divider 26. Compensation capacitor 24 provides frequency compensation to stabilize the loop as disclosed in U.S. Pat. No. 5,631,598.

In operation, any difference in the voltage inputs on error amplifier 20 produces an output to driver 18 causing it to operate pass device 22 to increase or decrease the current to maintain the voltage output, $V_{out}$, constant to load 14. One of the problems with this type of regulator is that the pass device 22 must be sized large enough to drive the maximum load 14. So the output impedance of driver 18 must be low enough to drive the gate of pass device 22 fast enough to track changes in the load 14 or input voltage, $V_{in}$. To provide that low output impedance in driver 18 there is required a high bias current. While the high bias current is consistent with efficient operation in high load conditions, it is not in low load conditions.

One approach to overcoming this problem is to replicate the entire circuit including the error amplifier 20, driver 18 and compensation circuit 24, but this gives rise to two other shortcomings. First it requires two error amplifiers 20 and two compensation circuits 24 which increases the amount of space required on the chip for the voltage regulator. In addition, having two different error amplifiers means that they must be precisely matched or their offset will introduce an error of its own into the output voltage $V_{out}$.

Figure 2:
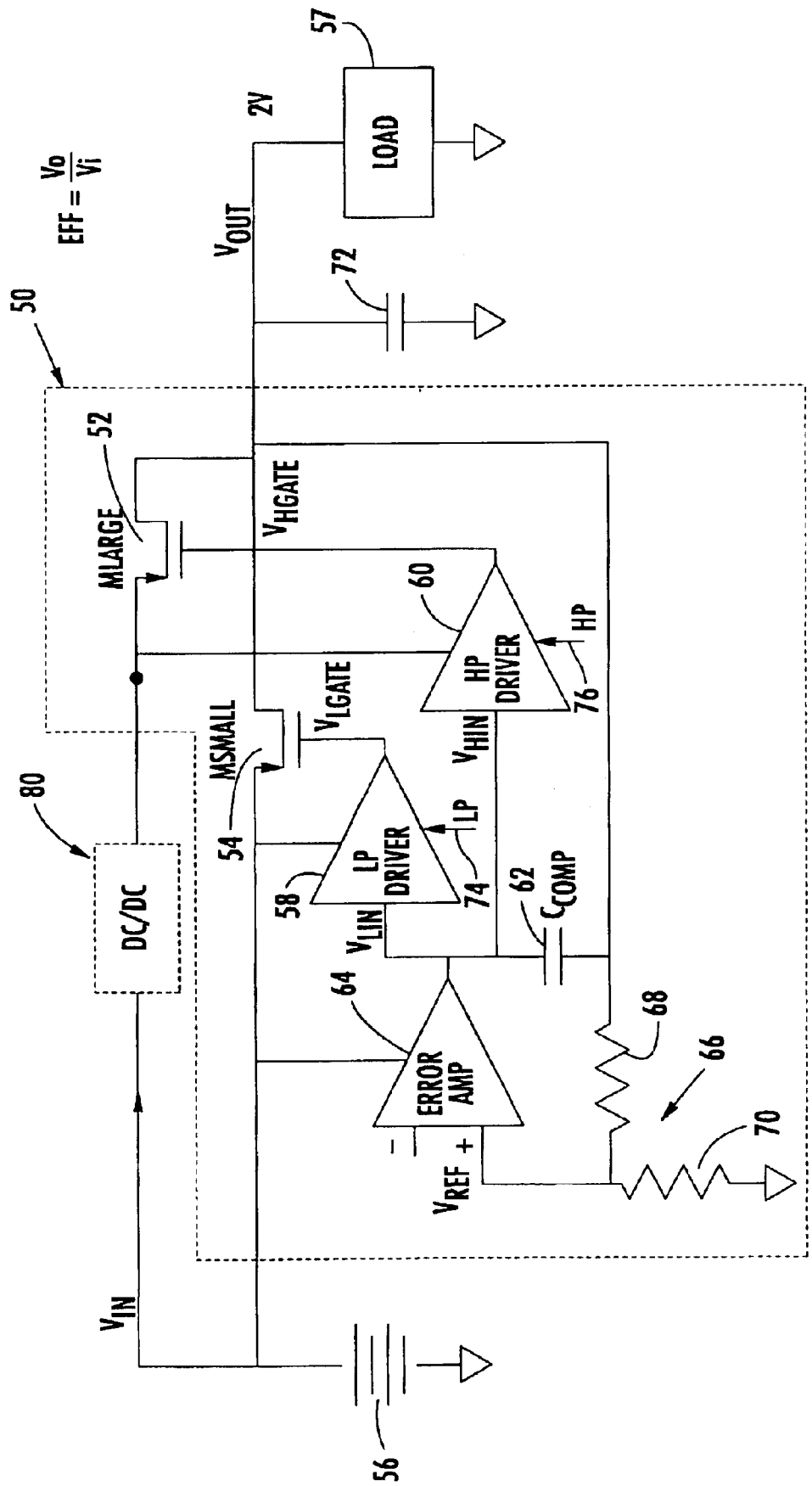
FIG. 2 is a simplified schematic diagram of a multimode voltage regulator according to this invention.

In multimode regulator 50, FIG. 2, according to this invention there is employed two pass devices, high current pass device 52 and low current pass device 54, each of which is interconnected between power supply battery 56 and load 57. Low current pass device 54 is driven by low power driver 58 while the high current pass device 52 is driven by high power driver 60. Multimode regulator 50 requires only a single compensation circuit, capacitor 62, and a single error amplifier 64. There is also provided a voltage divider 66 including resistors 68 and 70. A filter, capacitor 72, is also associated with load 57. Regulator 50 thus uses a single error amplifier and single compensation circuit 62 thereby eliminating the chip space required for a second error amplifier and compensation circuit.

In operation in high power mode, high power driver 60 responds to an error signal from error amplifier 64 to drive high current pass device 52 to supply power to load 57. While in low power mode, low power driver 58 responds to an error signal from error amplifier 64 to drive low current pass device to provide power to load 57. In this way, high power driver 60 need only be on when it is necessary to supply high power through high current pass device 52 to load 57 and does not have to be on during the low power mode which would reduce efficiency. Low power driver 58 is on during low power mode of operation and can be left on or turned off in the high power mode since the small drain of its bias current would have little effect on the overall efficiency in high power mode. Each of drivers 58 and 60 have a control terminal 74, 76 respectively, which typically receives a digital signal to turn it on or turn it off in accordance with the expected constitution of the load, that is whether the load is low or high, respectively.

Efficiency can be improved even more using DC/DC converter 80 between power supply, battery, 56 and high current pass device 52. By dropping more of the power supply voltage across DC/DC converter 80 and dropping less of the voltage across high current pass device 52, where the power loss is greater, the overall efficiency can be improved. This can be seen from the following example:

$$\frac{n_{DC/DC} \cdot V_{out}}{|V_{SD52}| + V_{out}} = n_{m.m.LDO} \tag{1}$$

where $n_{DC/DC}$ is the efficiency of DC/DC and $|V_{SD52}|$ is the absolute source drain voltage of device 52 (high current pass device).

Figure 3:
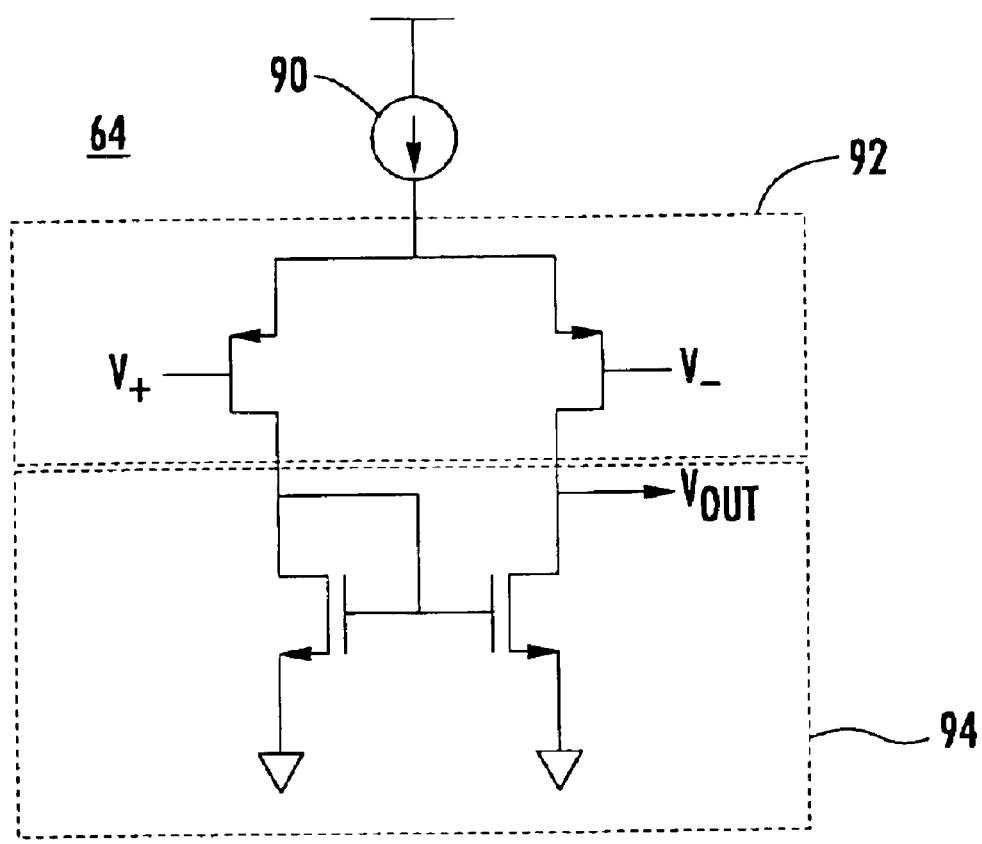
FIG. 3 is a more detailed schematic diagram of the error amplifier of FIG. 2.

Error amplifier 64, FIG. 3 may be a differential amplifier with a differential input and single ended output. There may be a current source 90 which biases differential pair 92 and a current mirror 94 which operates in the conventional manner. Low power driver 58 may be implemented with a non-inverting driver circuit, FIG. 4, such as disclosed in U.S. Pat. No. 6,225,857. $V_{lin}$ the input from error amplifier 64 is provided at the gate of transistor 100 whose drain is connected directly to the gate of transistor 102 and through resistance $R_f$ through feedback resistor 104 to the drain of transistor 102. Current $I_1$ is supplied by current source 106, current $I_2$ by current source 108. The voltage $V_{lgate}$ is provided at output 110 which is the input to the gate of the low current pass device 54. The use of this particular non-inverting amplifier provides good power supply rejection at high frequency because while $V_{lin}$ is referred to ground as is the error amplifier 64, $V_{lgate}$ output is referred to supply. Since $V_{lgate}$ tracks the supply, the voltage across the gate to source terminals of low current pass device 54 remains constant as does the current through the device from source to drain. Thus, even if supply 56 changes in voltage the output voltage $V_{out}$ on load 57 will not.

Figure 4:
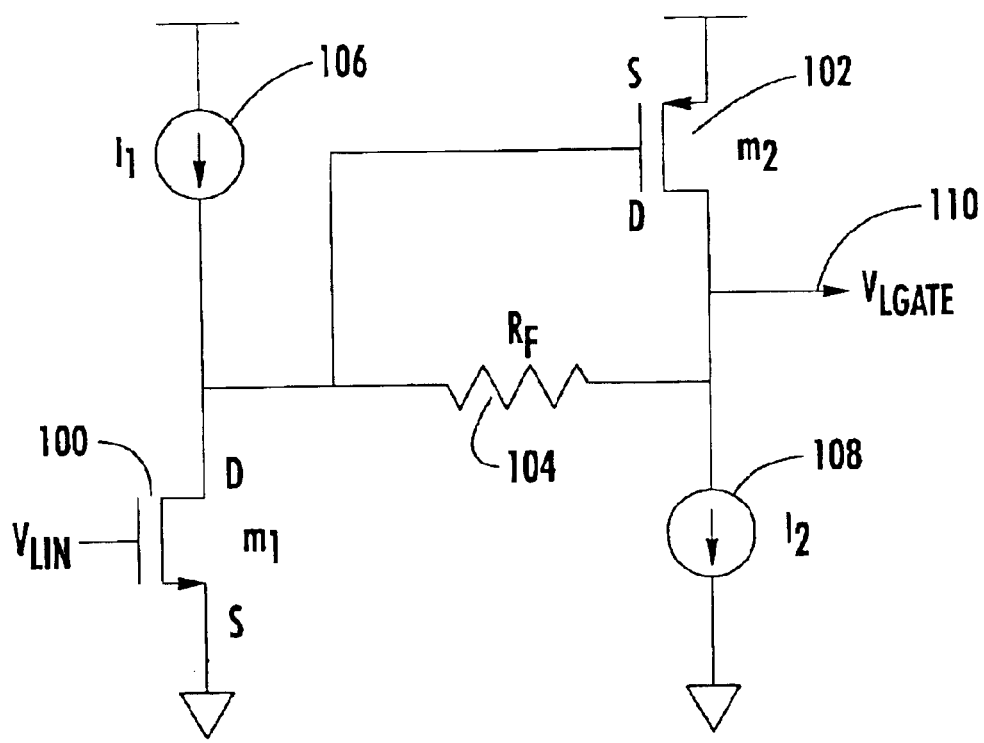
FIG. 4 is a more detailed schematic diagram of the low power driver of FIG. 3.
Figure 5:
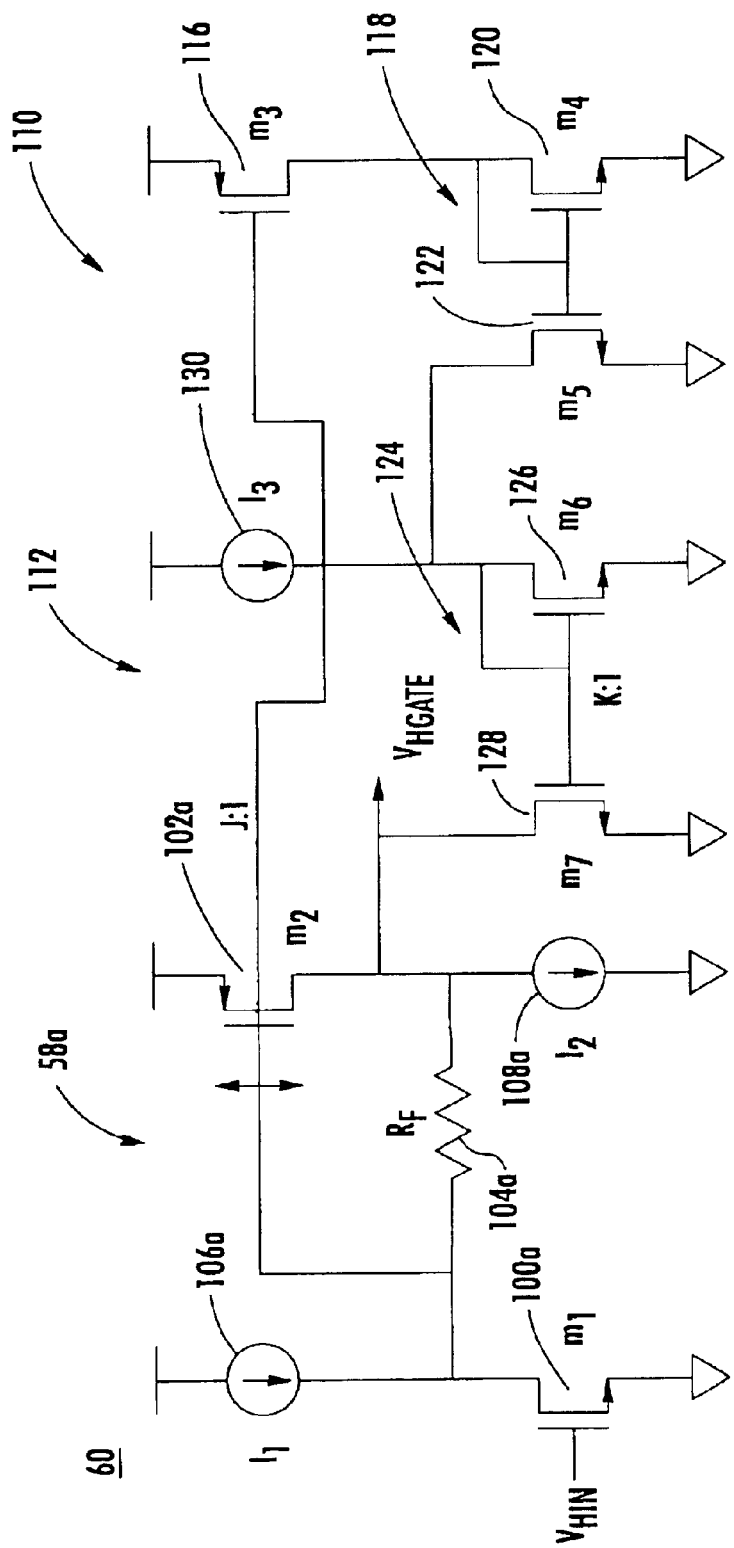
FIG. 5 is a simplified schematic diagram of the high power driver of FIG. 2.

High power driver 60, FIG. 5, may include non-inverting driver 58a, similar to low power driver 58, FIG. 4, and a dynamic bias current boost system 110 which includes a current mirror 112 constituted by transistors 102a and 116, a second current mirror 118 including transistors 120 and 122, and current mirror 124 including transistors 126 and 128, and current source 130.

Normally, current $I_2$ supplied by current source 108a flows through transistor 102a. A scaled down version of that current flows through transistor 116 and also through transistor 120. The same current is reflected through the current mirror in transistor 122. This causes the majority of the current $I_3$ from current source 130 to flow through transistor 122 and thus normally there is very little current in transistors 126 and 128. However, when the load draws more current, the gate of high current pass device 52 must go low. When $V_{hgate}$ goes low current is drawn through $V_{hgate}$ to current source $I_2$ this reduces the current in transistor 102a thus reducing it in the other half of the mirror, transistor 116. This also reduces the current through transistors 120 and 122 of mirror 118. More of the current $I_3$ from current source 130 now goes through transistors 126 and 128 of mirror 124. Thus, there is more current pulling down on $V_{hgate}$. This enables the system to have a fast response to a current transient. When $V_{hgate}$ reaches the voltage necessary, all of the current $I_2$ from current source 108a flows through transistor 102a. That same current is mirrored in transistor 116 and then in transistors 120 and 122. Once again, most of the $I_3$ current from current source 130 flows again through transistor 122.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A multimode voltage regulator comprising:
a low current pass device and a high current pass device each adapted for connection between a power supply and a load;
an error amplifier having an output line and responsive to a difference between a reference voltage and a function of the voltage on the load to produce an error signal on the output line; and
a low power driver responsive in a low load power mode to said error signal on the output line for operating said low current pass device to provide low power to the load and a high power driver responsive in a high load power mode to said error signal on the output line for operating said high current pass device to provide high power to the load for maintaining efficiency over high and low load power signals.

2. The multimode voltage regulator of claim 1 in which said low power driver is on in both the high power mode and low power mode.

3. The multimode voltage regulator of claim 1 in which said high power driver is on only in the high power mode.

4. The multimode voltage regulator of claim 1 in which said high power driver includes a control terminal for turning said high power driver on during a high power mode and off during a low power mode.

5. The multimode voltage regulator of claim 1 in which said low power driver includes a control terminal for turning it on during a low power mode and off during a high power mode.

6. The multimode voltage regulator of claim 1 in which said pass devices are transistors.

7. The multimode voltage regulator of claim 6 in which said low pass device has a smaller active area and said high pass device has a larger active area.

8. The multimode voltage regulator of claim 1 in which said error amplifier includes a current source, a differential pair, and a current mirror.

9. The multimode voltage regulator of claim 1 in which said low power driver includes a non-inverting driver circuit.

10. The multimode voltage regulator of claim 1 in which said high power driver includes a non-inverting driver circuit with a dynamic bias current boost system for dynamically increasing the current output of said high power driver in the high load power mode.

11. The multimode voltage regulator of claim 1 further including a dc/dc converter between the power supply and said high current pass device.

12. The multimode voltage regulator of claim 1 further including a compensation circuit connected between the input of said high power driver and the output of said high power device.

13. The multimode voltage regulator of claim 1 further including a voltage divider connected between the output of said high pass device and said error amplifier to produce said function of said voltage on the load.

14. A multimode voltage regulator comprising:
transistors configured as a low current pass device and a high current pass device each adapted for connection between a power supply and a load;
an error amplifier responsive to a difference between a reference voltage and a function of the voltage on the load to produce an error signal;
a smaller active area low power driver, responsive in a low load power mode to said error signal, for operating said low current pass device to provide low power to the load; and
a larger active area high power driver, responsive in a high load power mode to said error signal, for operating said high current pass device to provide high power to the load.

15. A multimode voltage regulator comprising:
a low current pass device and a high current pass device each adapted for connection between a power supply and a load;
an error amplifier including a current source, a differential pair, and a current mirror, said error amplifier responsive to a difference between a reference voltage and a function of the voltage on the load to produce an error signal;
a low power driver, responsive in a low load power mode to said error signal, for operating said low current pass device to provide low power to the load; and
a high power driver, responsive in a high load power mode to said error signal, for operating said high current pass device to provide high power to the load.

* * * * *